(12) United States Patent
Yoshizumi

(10) Patent No.: US 10,953,548 B2
(45) Date of Patent: Mar. 23, 2021

(54) PERFORM PEG-IN-HOLE TASK WITH UNKNOWN TILT

(71) Applicant: INTERNATIONAL BUSINESS MACHINES CORPORATION, Armonk, NY (US)

(72) Inventor: Takayuki Yoshizumi, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 341 days.

(21) Appl. No.: 16/039,879

(22) Filed: Jul. 19, 2018

(65) Prior Publication Data
US 2020/0023520 A1    Jan. 23, 2020

(51) Int. Cl.
*B25J 9/16*    (2006.01)

(52) U.S. Cl.
CPC .......... *B25J 9/1687* (2013.01); *B25J 9/161* (2013.01); *B25J 9/1633* (2013.01);
(Continued)

(58) Field of Classification Search
CPC .... A61B 2034/2055; A61B 2034/2065; A61B 2090/0811; A61B 6/547; A61B 2017/2936; A61B 2017/2947; A61B 5/1122; A61B 5/4528; B29C 64/386; G05D 1/0016; G05D 1/0022; G05D 1/0227; G05D 1/0246; G05D 1/0274; G05D 3/125; B07C 2501/0063; B07C 5/3422; B60L 2250/16; B62B 5/0069; B65F 2210/168; G05B 19/042; G05B 2219/35134; G05B 2219/39343; G05B 2219/40032; G05B 2219/40392;
(Continued)

(56) References Cited

U.S. PATENT DOCUMENTS 7,181,314 B2    2/2007    Zhang et al.
9,102,061 B2    8/2015    Schmirgel et al.
(Continued)

FOREIGN PATENT DOCUMENTS

CN      106886165 A    6/2017

OTHER PUBLICATIONS

Liu et al., Laser tracker-based control for peg-in-hole assembly robot, 2014, IEEE, p. 569-573 (Year: 2014).*
(Continued)

*Primary Examiner* — McDieunel Marc
(74) *Attorney, Agent, or Firm* — Tutunjian & Bitetto, P.C.; Randall Bluestone

(57) ABSTRACT

A computer-implemented method executed by a robotic system for performing a positional search process in an assembly task is presented. The method includes applying forces to a first component to be inserted into a second component, detecting the forces applied to the first component by employing a plurality of force sensors attached to a robotic arm of the robotic system, extracting training samples corresponding to the forces applied to the first component, normalizing time-series data for each of the training samples by applying a variable transformation about a right tilt direction, creating a time-series prediction model of transformed training data, applying the variable transformation with different directions for a test sample, and calculating a matching ratio between the created time-series prediction model and the transformed test sample.

20 Claims, 6 Drawing Sheets

(52) U.S. Cl.
CPC .............. *G05B 2219/39342* (2013.01); *G05B 2219/39343* (2013.01); *G05B 2219/40032* (2013.01); *G05B 2219/40392* (2013.01)

(58) Field of Classification Search
CPC .......... G05B 2219/45066; G05B 2219/39342; Y10S 901/02; Y10S 901/28; B25J 9/1633; B25J 15/0019; B25J 9/163; B25J 9/1669; B25J 9/1679; B25J 9/1687; B65G 2203/041; B65G 2203/042; F16C 1/16; H02K 11/21; H04N 13/106; H04N 5/2258; H04N 5/23299
See application file for complete search history.

(56) References Cited

U.S. PATENT DOCUMENTS

| | | | |
|---|---|---|---|
| 2013/0197696 A1* | 8/2013 | Nammoto | B25J 13/085 |
| | | | 700/259 |
| 2014/0276944 A1* | 9/2014 | Farritor | A61B 34/30 |
| | | | 606/130 |
| 2015/0174760 A1 | 6/2015 | Fukuda et al. | |
| 2017/0334066 A1 | 11/2017 | Levine et al. | |
| 2020/0175397 A1* | 6/2020 | Wang | G06F 40/30 |

OTHER PUBLICATIONS

Li et al., Condition and Strategy Analysis for Assembly Based on Attractive Region in Environment, 2017, IEEE, p. 2218-2228 (Year: 2017).*
Zhou et al., Modelling Contact Forces for 3D Interactive Peg-in-Hole Virtual Reality Operations, 2008, IEEE, p. 1-6 (Year: 2008).*
Wang et al., Robot Learning from Human Demonstration of Peg-In-Hole Task, 2018, IEEE, p. 318-322 (Year: 2018).*
International Search Report and Written Opinion, cited in corresponding International Patent Application No. PCT/IB2019/055961, dated Sep. 29, 2019. (pp. 1-9.).

* cited by examiner

PERFORM PEG-IN-HOLE TASK WITH UNKNOWN TILT

BACKGROUND

Technical Field

The present invention relates generally to robotic assembly, and more specifically, to performing a peg-in-hole task with unknown tilt.

Description of the Related Art

Over the years, shifting manufacturing requirements to high flexibility, short production cycle time, and high throughput have enabled the emergence of intelligent manufacturing systems. Conventional industrial robots have high repeatability, but may lack adaptivity and flexibility. In manufacturing processes, the environment is constantly changing and parts and/or components to be processed could come from different batches and different suppliers. All of these variations can cause difficulty for conventional industrial robots to perform various manufacturing processes. Due to demanding requirements of manufacturing and limitations of conventional industrial robots, intensive human labors have been made in robot programming.

SUMMARY

In accordance with one embodiment, a computer-implemented method executed by a robotic system for performing a positional search process in an assembly task is provided. The computer-implemented method includes applying forces to a first component to be inserted into a second component, detecting the forces applied to the first component by employing a plurality of force sensors attached to a robotic arm of the robotic system, extracting training samples corresponding to the forces applied to the first component, normalizing time-series data for each of the training samples by applying a variable transformation about a right tilt direction, creating a time-series prediction model of transformed training data, applying the variable transformation with different directions for a test sample, and calculating a matching ratio between the created time-series prediction model and the transformed test sample.

In accordance with another embodiment, a robotic system for performing a positional search process in an assembly task is provided. The robotic system includes a robotic arm and a control system communicatively coupled to the robotic arm, the control system storing executable program instructions for causing the robotic arm to perform the steps of applying forces to a first component to be inserted into a second component, detecting the forces applied to the first component by employing a plurality of force sensors attached to the robotic arm, extracting training samples corresponding to the forces applied to the first component, normalizing time-series data for each of the training samples by applying a variable transformation about a right tilt direction, creating a time-series prediction model of transformed training data, applying the variable transformation with different directions for a test sample, and calculating a matching ratio between the created time-series prediction model and the transformed test sample.

In accordance with yet another embodiment, a robotic system is provided. The robotic system includes a robot constructed to assemble a first component to a second component, at least one sensor coupled to the robot, a control system communicatively coupled to the robot and to the at least one sensor, the control system storing executable program instructions for executing assembly motion of the robot, and a learning device communicatively coupled to the control system and operative to direct the robot via the control system. The control system performs the steps of extracting training samples corresponding to the forces applied to the first component, normalizing time-series data for each of the training samples by applying a variable transformation about a right tilt direction, creating a time-series prediction model of transformed training data, applying the variable transformation with different directions for a test sample, and calculating a matching ratio between the created time-series prediction model and the transformed test sample.

Furthermore, embodiments can take the form of a related computer program product, accessible from a computer-usable or computer-readable medium providing program code for use, by or in connection with a computer or any instruction execution system. For the purpose of this description, a computer-usable or computer-readable medium can be any apparatus that may include means for storing, communicating, propagating or transporting the program for use, by or in a connection with the instruction execution system, apparatus, or device.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein.

Throughout the drawings, same or similar reference numerals represent the same or similar elements.

DETAILED DESCRIPTION

Embodiments in accordance with the present invention provide methods and devices for employing a robotic system. The robotic system is controlled to employ assembly processes. One assembly process includes assembling a first component to a second component. The assembly process can broadly include two main phases. The first phase is a search phase and the second phase is an insertion phase. In the search phase, the first component is brought within a clearance region. In the insertion phase, an assembly of the first component and the second component takes place. Robotic systems are dynamic systems. Most of the dynamic systems are complex, nonlinear, and time varying. A variety of control techniques can be employed for dynamic systems. One such technique involves employing training samples to be compared to test samples to accomplish a peg-in-hole task.

Embodiments in accordance with the present invention provide methods and devices for implementing robotic systems with best operating conditions based on learning or training techniques. The robotic system can learn-by-doing by employing feedback from learning or training that is stored in memory and made available in accordance with present conditions. For example, if two parts are to be assembled, the two parts are identified along with their best conditions to identify a best assembly strategy.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Figure 1:
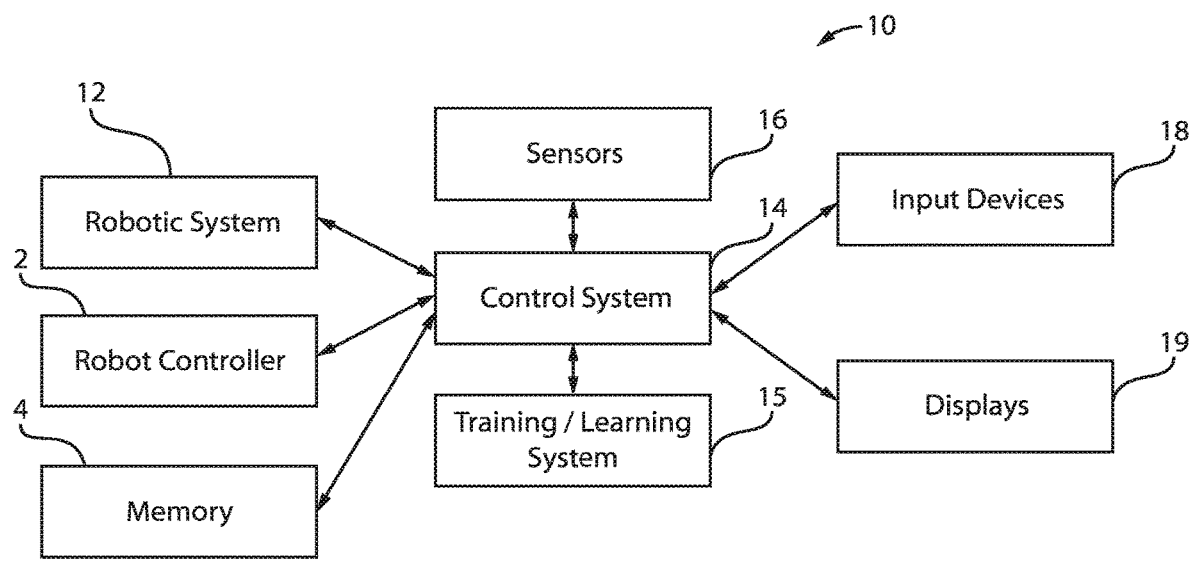
FIG. 1 is a block/flow diagram of an exemplary robotic system, in accordance with an embodiment of the present invention.

Referring now to the drawings in which like numerals represent the same or similar elements and initially to FIG. 1, a block/flow diagram of an exemplary robotic system is presented, in accordance with an embodiment of the present invention.

The block diagram 10 depicts a robotic system 12 in communication with a control system 14. The robotic system 12 can include one or more robots. The control system 14 is in communication with a training/learning system 15 and sensors 16. The control system 14 further communicates with input devices 18 and displays 19.

In one exemplary embodiment, control system 14 includes a dedicated robot controller and a data processing unit or controller 2. The robot controller and the input devices 18 can be communicatively coupled to the data processing controller. In one exemplary embodiment, the robot controller operates the robotic system 12 based on data provided by the data processing controller, which receives control input from another system or device, e.g., input devices 18 and training/learning system 15. The training/learning system 15 can adjust operating conditions of the robotic system 12 in order for the robotic system to perform at an optimal level based on best operating conditions derived from learning techniques.

Control system 14 can be microprocessor-based and the program instructions executed thereby are in the form of software stored in a memory 4. However, it is alternatively contemplated that any or all of the controllers and program instructions can be in the form of any combination of software, firmware and hardware, including state machines, and can reflect the output of discreet devices and/or integrated circuits, which can be co-located at a particular location or distributed across more than one location, including any digital and/or analog devices configured to achieve the same or similar results as a processor-based controller executing software and/or firmware and/or hardware based instructions.

In some embodiments, robotic system 12 can include one or more sensors 16, e.g., for use in operating robotic system 12 locally or remotely, for enhancing safety, and/or for other purposes. Sensors 16 can take any suitable form, e.g., including vision sensors such as cameras, acoustic sensors, infrared sensors or one or more other types of proximity sensors, microphones, position sensors, translational and rotational speed sensors, force sensors and/or any other types of sensors. Sensors 16 are communicatively coupled to control system 14. In some embodiments, control system 14 can include a controller communicatively coupled to one or more sensors 16 for processing the output of one or more sensors 16.

In one exemplary embodiment, input device 18 is a joystick. In other embodiments, input device 18 can take other forms, e.g., a stylus. Input device 18 can be constructed to allow the user to control or initiate the motions or movements of robotic system 12, e.g., via control system 14. In some embodiments, input device 18 can be constructed to control or initiate a position, direction and/or speed of rotational and translational motion of robotic system 12, e.g., end effector 28 (FIG. 2) based on feedback received from the training/learning system 15 in order to achieve best operating conditions for the robotic system 12.

In some embodiments, robotic system 12 includes one or more display devices 19 communicatively coupled to the data processing controller of control system 14. In one exemplary embodiment, display devices 19 are also input devices, e.g., a touch screen display. Display devices 19 display, for example, robot motion data, and can be employed to adjust or fine-tune parameters or variables to obtain best operating conditions based on the training/learning system 15.

The training/learning system 15 learns how to better understand the physical interaction model and to perform the assembly task. The physical interaction model relates to, e.g., exchanged forces and/or moments between the robotic system 12 and the environment. Thus, the memory based system is trained by using reinforcement learning. Reinforcement learning is conducted by choosing or selecting an action among decomposed actions and assembly movement actions at each step of the positional search process based on, e.g., corresponding force-torque data received from at least one sensor 16 associated with the robotic system 12.

Reinforcement learning problem setting can be considered as follows:

The robotic system 12 observes the environmental state to decide an action the robotic system 12 wishes to take. The environment can change according to a certain rule and a human can change the environment by his or her own action. A reward signal is returned every time an action is taken. The sum of the rewards in the future is to be maximized. Learning starts in a state in which a result to be brought about by the action is totally unknown or known only incompletely. In other words, the robotic system 12 can obtain the result of an action as data only after the robotic system 12 actually takes the action. This means that an optimal action can be searched for by, e.g., trial and error. Learning can be started from a good starting point by starting from an initial state in which learning has been performed in advance. In reinforcement learning, in addition to determination and classification, an action is learned to acquire a method for learning an appropriate action in consideration of interactions exerted on the environment by the action, e.g., learning to maximize the reward to be obtained in the future.

In one example, the reinforcement learning can be employed by the training/learning system 15 and can be implemented by, e.g., deep machine learning methods. The exemplary embodiments of the present invention can be directed generally to deep machine learning methods and apparatuses related to manipulation of an object by an end effector of a robot. Some implementations are directed to training a deep neural network, such as a convolutional neural network (also referred to herein as a "CNN"), to predict a probability that motion data for an end effector of a robot results in successful assembly of a first component to a second component by the end effector. For example, some implementations enable applying, as input to a trained deep neural network, at least: (1) a motion vector that defines a candidate motion of an insertion end effector of a robot and (2) an image that captures at least a portion of the work space of the robot; and generating, based on the applying, at least a measure that directly or indirectly indicates a probability that the motion vector results in successful insertion of the first component to the second component. The predicted probability can then be used in determining best operating conditions and monitoring performance of insertion attempts by the robotic system having an insertion end effector, thereby improving the ability of the robotic system to successfully insert the first component into the second component.

Some implementations of the training/learning system 15 can be directed to, e.g., utilization of the trained deep neural network to servo an end effector of a robot to achieve successful insertion of the first component into the second component. For example, the trained deep neural network can be utilized in the iterative updating of motion control commands for one or more actuators of a robot that control a position of an insertion end effector of the robot, and to determine when to generate insertion control commands to effectuate an attempted insert by the insertion end effector. In various implementations, utilization of the trained deep neural network to servo the insertion end effector can enable fast feedback to robotic perturbations and/or motion of environmental object(s) and/or robustness to inaccurate robotic actuation(s). The trained deep neural network can also enable reduction in the number of perturbations in order to achieve best operating conditions of the robotic system 12.

In some implementations of the training/learning system 15, a method can be provided that, e.g., includes generating a candidate end effector motion vector that defines motion to move an insertion end effector of a robot from a current position to a subsequent position that enables more efficient assembly strategies. The method can, in one example, further include identifying a current image that is captured by a vision sensor associated with the robotic system 12 and that captures the insertion end effector and at least one object in an environment of the robotic system 12. The method can further include applying the current image and the candidate end effector motion vector as input to a trained convolutional neural network and generating, over the trained convolutional neural network, a measure of successful inserts of the object with application of the motion. The measure is generated based on the application of the image and the end effector motion vector to the trained convolutional neural network.

In some implementations of the training/learning system 15, a method can be provided that includes, e.g., identifying a plurality of training examples generated based on sensor output from one or more robots during a plurality of insert attempts by the robots. Each of the training examples including training example input and training example output. The training example input of each of the training examples includes: an image for a corresponding instance of time of a corresponding insert attempt of the insert attempts, the image capturing a robotic end effector and one or more environmental objects at the corresponding instance of time, and an end effector motion vector defining motion of the end effector to move from an instance of time position of the end effector at the corresponding instance of time to a final position of the end effector for the corresponding insert attempt. The training example output of each of the training examples can include, e.g., an insert success label indicative of success of the corresponding insert attempt. The method further includes training the convolutional neural network based on the training examples to achieve best operating conditions for the robotic system 12.

In some implementations of the training/learning system 15, training the convolutional neural network includes applying, to the convolutional neural network, the training example input of a given training example of the training examples. In some of those implementations, applying the training example input of the given training example includes: applying the image of the given training example as input to an initial layer of the convolutional neural network and applying the end effector motion vector of the given training example to an additional layer of the convolutional neural network. The additional layer can be downstream of the initial layer. In some of those implementations, applying the end effector motion vector to the additional layer includes: passing the end effector motion vector through a fully connected layer to generate end effector motion vector output and concatenating the end effector motion vector output with upstream output. The upstream output can be from an immediately upstream layer of the convolutional neural network that is immediately upstream of the additional layer and that is downstream from the initial layer and from one or more intermediary layers of the convolutional neural network. The initial layer can be a convolutional layer and the immediately upstream layer can be a pooling layer.

In some implementations, the training includes performing backpropagation on the convolutional neural network based on the training example output of the plurality of training examples. Therefore, the learning/training system 15 can have the function of extracting, e.g., a useful rule, a knowledge representation, and a determination criterion by analysis from a set of data input to the learning/training system 15, outputting determination results, and learning knowledge (machine learning). It is noted that a variety of machine learning techniques are available, which can be roughly classified into, e.g., "supervised learning," "unsupervised learning," and "reinforcement learning." To implement these techniques, "deep learning" can be employed, as discussed above.

Figure 2:
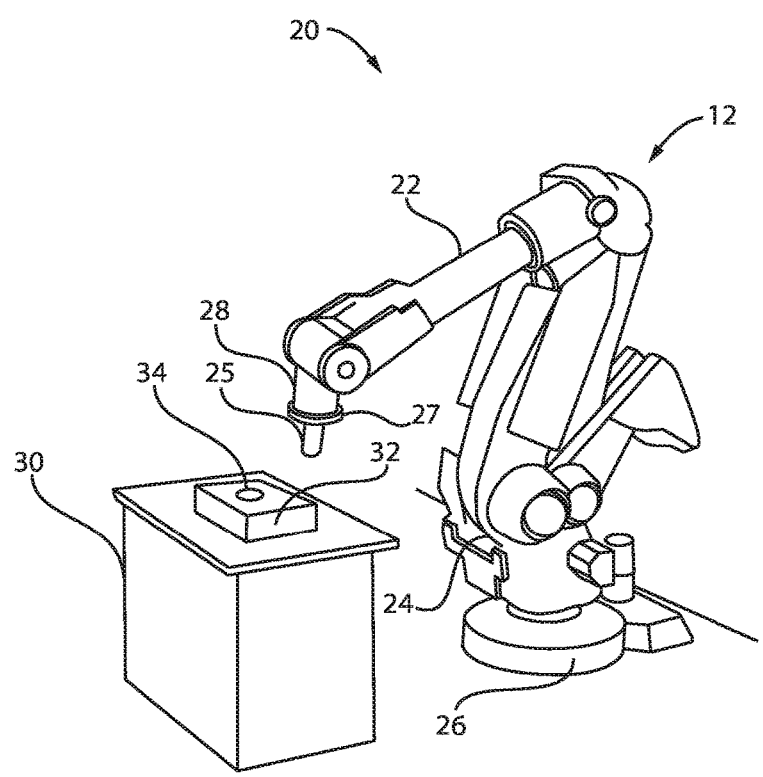
FIG. 2 is a block/flow diagram of an exemplary robotic system in a work cell, in accordance with an embodiment of the present invention.

FIG. 2 is a block/flow diagram of an exemplary robotic system in a work cell, in accordance with an embodiment of the present invention.

In one exemplary embodiment, the robotic system 12 can be a multi-axis industrial robot disposed in, e.g., a work cell 20. The assembly work can be automated and triggered to be initiated by a user. For example, robotic system 12 can be initiated or triggered by using input devices 18 from any location outside of work cell 20 to assemble a first component, generically represented as component 25, to a second component, generically represented as component 32, e.g., disposed on a work table or fixture 30. For instance, robotic system 12 can be operated to insert component 25 into an opening 34 of component 32. The robotic system 12 can use learned techniques in order to be optimally programmed based on best operating conditions. For example, the robotic system 12 employs feedback from learning/training that is stored in the memory 4 and made available in accordance with the present conditions to continuously adjust or fine-tune operations to an optimal level. In various embodiments, robotic system 12 can take any form suited to the application for which it is employed, and can be any type of robot constructed to perform any type of manufacturing work or other operation.

In one exemplary embodiment, robotic system 12 can include a pedestal 26, a shoulder 24 coupled to and rotatable about pedestal 26, and an upper arm or rotatable arm 22 coupled to shoulder 24. The rotatable arm 22 culminates in a rotatable end effector 28. In other exemplary embodiments, robotic system 12 can have a greater or lesser number of appendages and/or degrees of freedom. In one exemplary embodiment, end effector 28 is configured to grip and manipulate component 25 for assembly with component 32 based on input received from the training/learning system 15. In other exemplary embodiments, end effector 28 can take other forms, and can be configured for performing other operations, e.g., any operations related to or unrelated to component 25. Robotic system 12 can be constructed to translate and rotate component 25 in a minimal number of steps, in and about the X, Y, and Z axes, e.g., as illustrated in FIG. 3.

In some exemplary embodiments, robotic system 12 can have associated therewith a haptic feedback sensor 27. The sensor 27 can be operative to detect interactions between component 25 and anything else in its immediate environment, e.g., physical interactions between component 25 (e.g., while held by robotic system 12) and component 32, or between component 25 and anything within the reach of robotic system 12. In one exemplary embodiment, haptic feedback sensor 27 is a force sensor. In other embodiments, haptic feedback sensor 27 can take other forms. Force sensor 27 can be communicatively coupled to control system 14. In one exemplary embodiment, sensor 27 can be mounted on robotic system 12, e.g., on end effector 28. In other embodiments, sensor 27 can be mounted at any suitable location or on any suitable feature of robotic system 12 or component 25.

Figure 3:
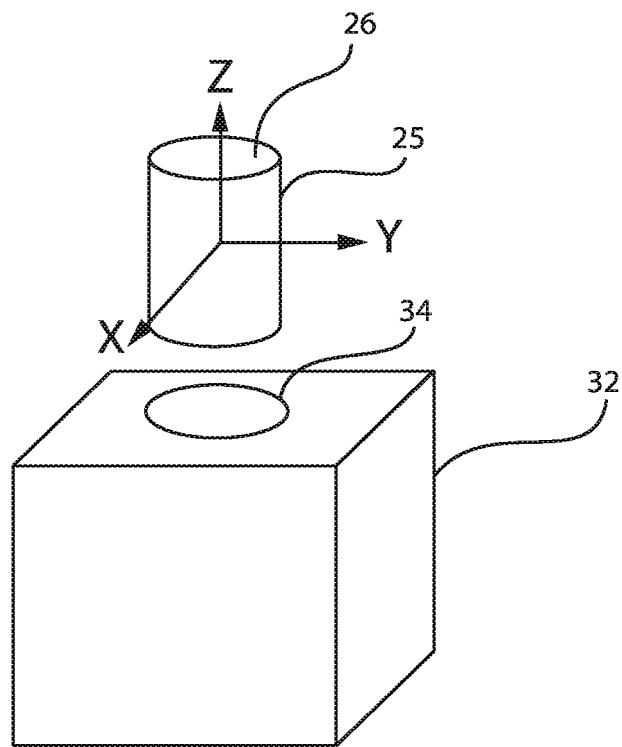
FIG. 3 is a block/flow diagram of an exemplary peg-in-hole assembly employed in describing the robotic system, in accordance with an embodiment of the present invention.

FIG. 3 is a block/flow diagram of an exemplary peg-in-hole assembly employed in describing the robotic system, in accordance with an embodiment of the present invention.

Some aspects of a non-limiting example of a peg-in-hole assembly are employed in describing a non-limiting example of an embodiment of the present invention. In FIG. 3, a first component, peg 25, is sought to be inserted into a hole 34 in a block 32. In difficult assembly cases, e.g., where the clearance between peg 25 and hole 34 is low and any chamfers on peg 25 and hole 34 are small, manual insertion using tele-operated motion alone can be difficult, even with haptic feedback. For example, a slight misalignment between the components might result in jamming or binding.

Figure 4:
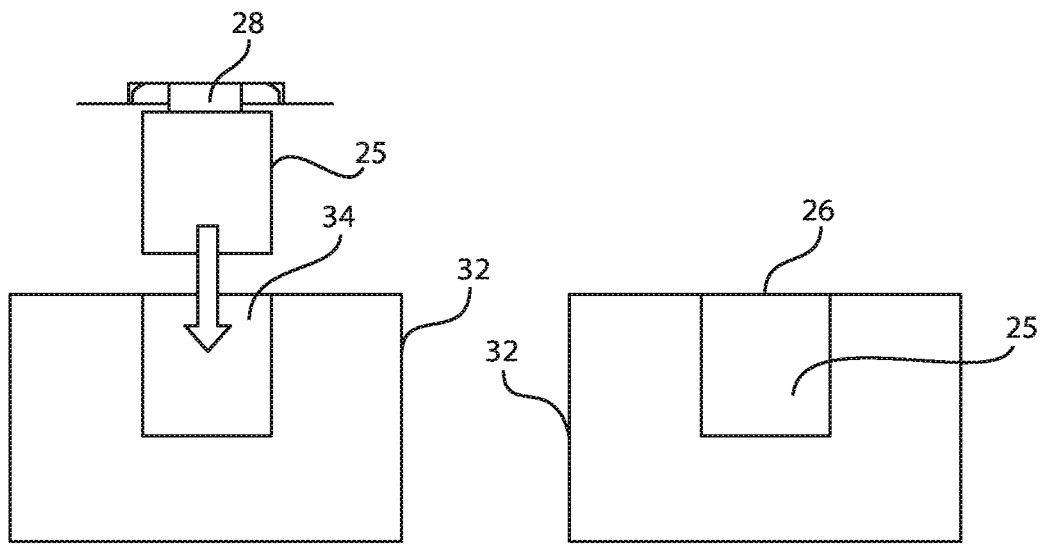
FIG. 4 is a cross-sectional view of a first component being successfully inserted into a second component via a robotic arm of the robotic system, in accordance with an embodiment of the present invention.

FIG. 4 is a cross-sectional view of a first component being successfully inserted into a second component via a robotic arm of the robotic system, in accordance with an embodiment of the present invention.

The first component 25 is shown to be successfully received within the hole 34 of the second component 32. The first component 25 is configured to be flush with the inner walls of the second component 32. This is achieved by the training/learning system 15. Some implementations of the training/learning system 15 can be directed to training a deep neural network, such as a CNN, to enable utilization of the trained deep neural network to predict a measure indicating the probability that motion data for an insertion end effector of a robot results in a successful insertion of the first component 25 into the second component 32. In some implementations, the trained deep neural network accepts an image generated by a vision sensor and accepts an end effector motion vector. The application of the image and the end effector motion vector to the trained deep neural network can be used to generate, over the deep neural network, a predicted measure that executing command(s) to implement the motion defined by motion vector, and subsequent inserting, will produce a successful insertion of the first component 25 into the second component 32. Some implementations are directed to utilization of the trained deep neural network to servo the end effector of a robot to achieve successful insertion of the first component 25 into the second component 32 in a minimal number of steps based on the feedback received from the training/learning system 15.

Figure 5:
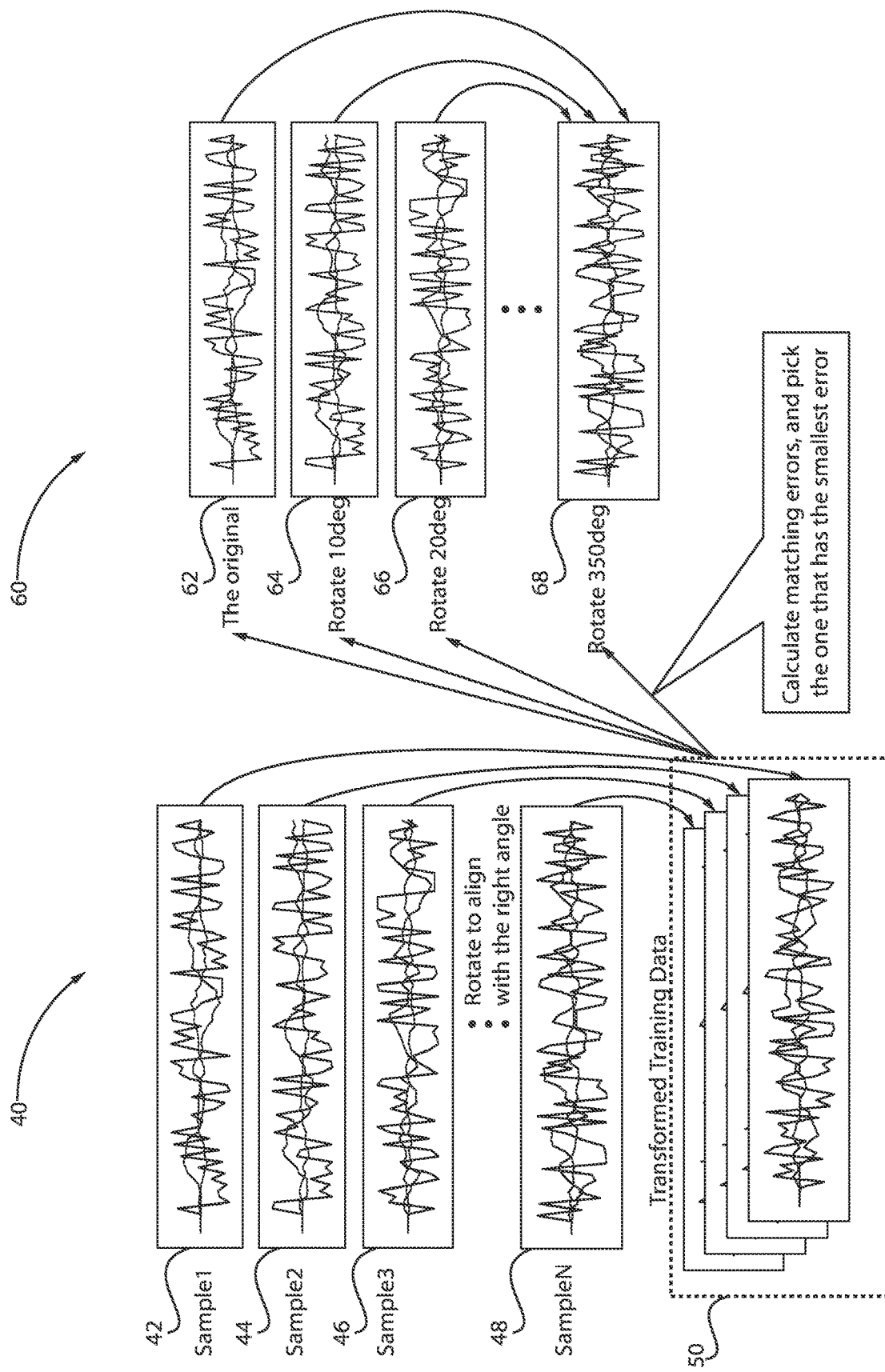
FIG. 5 is a block/flow diagram of an exemplary training phase and test phase, in accordance with an embodiment of the present invention.

FIG. 5 is a block/flow diagram of an exemplary training phase and test phase, in accordance with an embodiment of the present invention.

The following assumptions are made for the data properties:

Data is a time-series of data that can be obtained by applying random xy forces for a certain time period. The forces can be measures by a plurality of force sensors.

One training sample can include six dimensional time-series data, and right tilt direction(θ) can be obtained as follows:

Data: inFx, inFy: input forces on xy direction.
Data: Fx, Fy: force sensor values on xy directions.
Data: Mx, My: force sensor moments around xy axes.

If the tilt magnitude needs to be estimated, a right tilt magnitude (φ) can also be added.

In the training phase:

For each training sample, the method normalizes time-series data by applying a variable transformation about the right tilt direction (θ) as follows:

$$inFx'=inFx\cos(-\theta)-inFx\sin(-\theta)$$

$$inFy'=inFx\sin(-\theta)+inFx\cos(-\theta)$$

The same variable transformation is applied for (Fx, Fy) and (Mx, My) pairs.

A time-series model of transformed training data can now be built or created.

For a time-series prediction model, Vector Auto Regression (VAR) can be used.

The transformed time-series data should have the same or similar characteristics as a time-series data.

In the test phase:

For a test sample, the variable transformation is applied with different directions. (e.g., 10 deg, 20 deg, 30 deg, etc.)

The matching ratio between the model created in the training phase and each of transformed test data is then calculated.

For the matching ratio, the sum of squares of each time point and each dimension can be employed.

As a result, the direction value that has best matching value can be output as an estimation result (estimation for tilt direction).

In the training phase 40, a set of samples 42, 44, 46, 48 can be processed to create a time series prediction model of transformed training data 50. Such transformed training data 50 is compared to at least one test sample. Thus, in a testing phase 60, a test sample is selected and variable transformation with different directions is applied to the selected test sample to output estimation results 62, 64, 66, 68. The estimation results are provided for different tilt directions (e.g., 10 degrees, 30 degrees, 350 degrees).

Therefore, the exemplary embodiments pertain to a control algorithm for a robot. The control algorithm controls the insertion of a peg in a hole. The peg-in-hole task employs time-series force sensor information. The control algorithm processes time-series data by applying variable transformation with different directions on testing samples and calculates a matching ratio between a prediction model built in the training phase and each of the transformed test data. In other words, in a training phase, training data is acquired and a time-series prediction model is created. Then in a test phase, a test sample is selected and variable transformation with different directions is applied to the selected test sample. A matching ratio can now be calculated between the time-series prediction model and the transformed data sample to obtain an estimation result (estimation of tilt direction).

Figure 6:
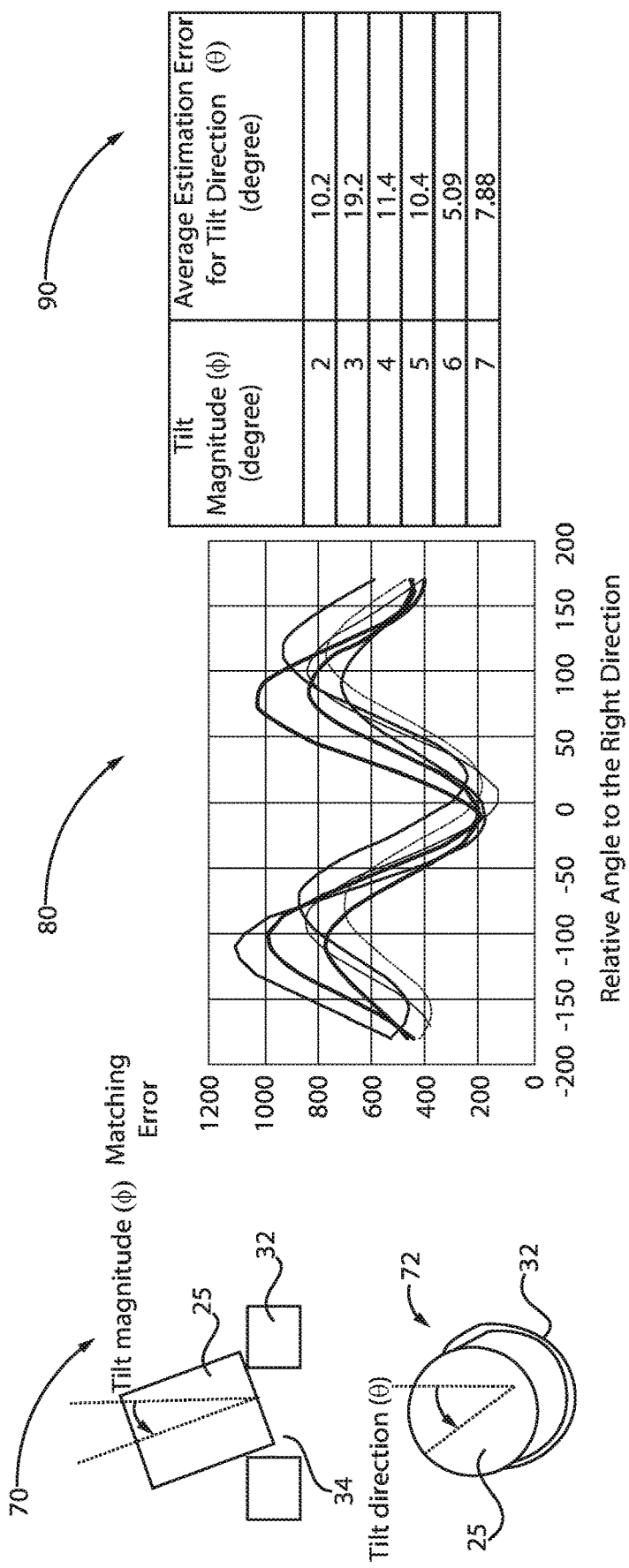
FIG. 6 is a block/flow diagram of exemplary estimation results of tilt direction, in accordance with an embodiment of the present invention.

FIG. 6 is a block/flow diagram of exemplary estimation results of tilt direction, in accordance with an embodiment of the present invention.

Diagram 70 is a side view and diagram 72 is a top view of an object 25 attempting to be inserted, by, e.g., a robotic arm of a robotic system, within an opening 34 defined by component 32. Diagram 70 illustrates the tilt magnitude ($\varphi$) and diagram 72 illustrates the tilt direction ($\theta$).

Diagram 80 depicts the relative angle to the right direction versus the matching error.

Table 90 provides the average estimation error for tilt direction. Even in the worst case scenario, the average prediction accuracy is less than 20%.

Figure 7:
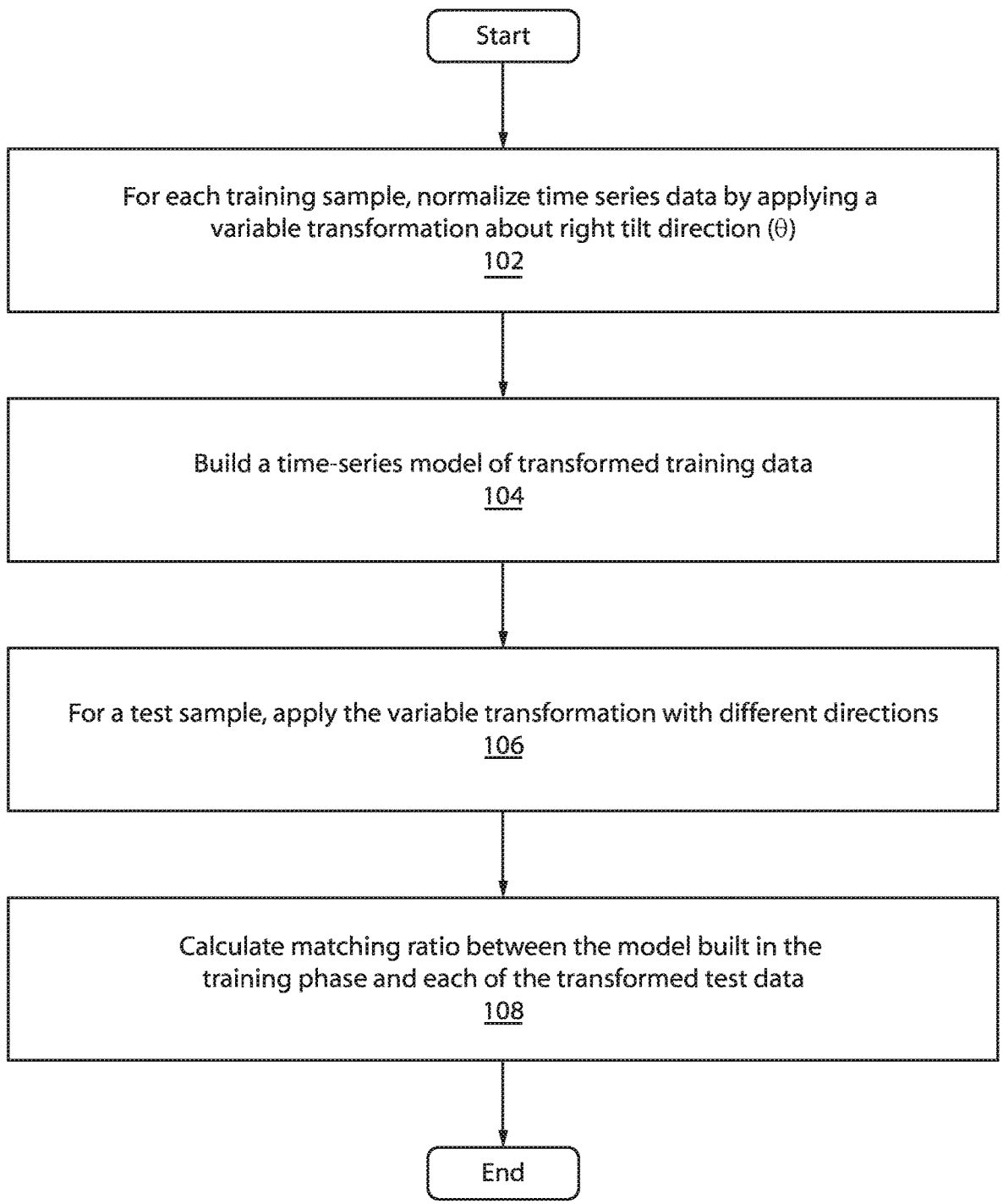
FIG. 7 is a block/flow diagram of an exemplary method for performing a positional search process in an assembly task, in accordance with an embodiment of the present invention.

FIG. 7 is a block/flow diagram of an exemplary method for performing a positional search process in an assembly task, in accordance with an embodiment of the present invention.

At block 102, for each training sample, normalize time-series data by applying a variable transformation about right tilt direction ($\theta$). The time series data can be obtained from a plurality of force sensors measuring a force applied at different time periods to a, e.g., peg.

At block 104, build or create a time-series prediction model of transformed training data.

At block 106, for a test sample, apply the variable transformation with different directions.

At block 108, calculate matching ratio between the model created in the training phase and each of the transformed test data.

Figure 8:
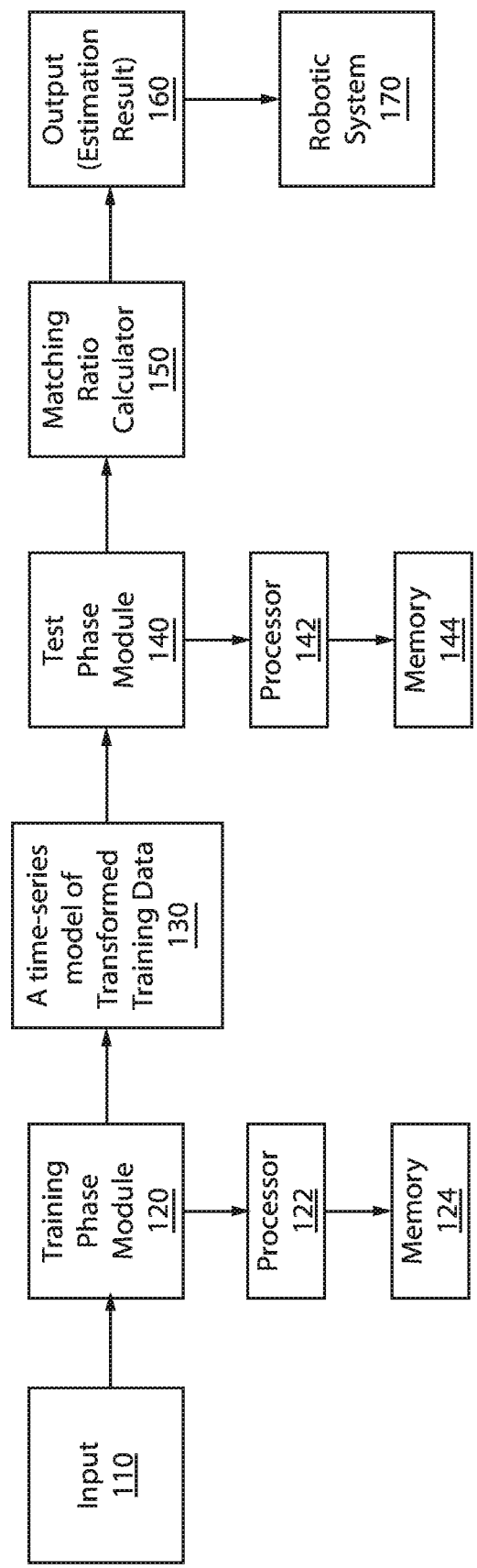
FIG. 8 is a block/flow diagram of an exemplary method for manipulating training samples and test samples to accomplish the peg-in-hole task, in accordance with an embodiment of the present invention.

FIG. 8 is a block/flow diagram of an exemplary method for manipulating training samples and test samples to accomplish the peg-in-hole task, in accordance with an embodiment of the present invention.

Training samples 110 are input into the training phase module 120, which can communicate with a processor 122 and a memory 124. The training phase module 120 outputs a time-series model of transformed training data 130, which are then provided to the test phase module 140. The test phase module 140 can communicate with a processor 142 and a memory 144. The test phase module 140 outputs data to a matching ratio calculator 150, which in turn output estimation results 160 (of tilt direction) to a robotic system 170.

The descriptions of the various embodiments of the present invention have been presented for purposes of illustration, but are not intended to be exhaustive or limited to the embodiments described. Many modifications and variations will be apparent to those of ordinary skills in the art without departing from the scope and spirit of the described embodiments. The terminology used herein was chosen to best explain the one or more embodiments, the practical application or technical improvement over technologies found in the marketplace, or to enable others of ordinary skills in the art to understand the embodiments described herein.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for performing a peg-in-hole task with unknown tilt (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method executed by a robotic system for performing a positional search process in an assembly task, the method comprising:
    applying forces to a first component to be inserted into a second component;
    detecting the forces applied to the first component by employing a plurality of force sensors attached to a robotic arm of the robotic system;
    extracting training samples corresponding to the forces applied to the first component, the training samples generated based on sensor output from robots performing insertion attempts;
    normalizing time-series data for each of the training samples by applying a variable transformation about a right tilt direction;
    creating a time-series prediction model of transformed training data;
    applying the variable transformation with different directions for a test sample; and calculating a matching ratio between the created time-series prediction model and the transformed test sample.

2. The method of claim 1, further comprising outputting a direction value having a best matching value as an estimation result.

3. The method of claim 1, wherein the time-series data includes six-dimensional time-series data.

4. The method of claim 3, wherein one pair of the time-series data includes input forces.

5. The method of claim 4, wherein another pair of the time-series data includes force sensor values.

6. The method of claim 1, wherein another pair of the time-series data includes force sensor moments.

7. The method of claim 1, wherein calculating the matching ratio includes determining a sum of squares of each time point when a force is applied to the first component.

8. A robotic system for performing a positional search process in an assembly task, the robotic system comprising:
a robotic arm; and
a control system communicatively coupled to the robotic arm, the control system storing executable program instructions for causing the robotic arm to perform the steps of:
applying forces to a first component to be inserted into a second component;
detecting the forces applied to the first component by employing a plurality of force sensors attached to the robotic arm;
extracting training samples corresponding to the forces applied to the first component, the training samples generated based on sensor output from robots performing insertion attempts;
normalizing time-series data for each of the training samples by applying a variable transformation about a right tilt direction;
creating a time-series prediction model of transformed training data;
applying the variable transformation with different directions for a test sample; and
calculating a matching ratio between the created time-series prediction model and the transformed test sample.

9. The robotic system of claim 8, wherein a direction value having a best matching value is output as an estimation result.

10. The robotic system of claim 8, wherein the time-series data includes six-dimensional time-series data.

11. The robotic system of claim 10, wherein one pair of the time-series data includes input forces.

12. The robotic system of claim 11, wherein another pair of the time-series data includes force sensor values.

13. The robotic system of claim 12, wherein another pair of the time-series data includes force sensor moments.

14. The robotic system of claim 8, wherein calculating the matching ratio includes determining a sum of squares of each time point when a force is applied to the first component.

15. A robotic system, comprising:
a robot constructed to assemble a first component to a second component;
at least one sensor coupled to the robot;
a control system communicatively coupled to the robot and to the at least one sensor, the control system storing executable program instructions for executing assembly motion of the robot; and
a learning device communicatively coupled to the control system and operative to direct the robot via the control system, the control system performing the steps of:
extracting training samples corresponding to the forces applied to the first component, the training samples generated based on sensor output from robots performing insertion attempts;
normalizing time-series data for each of the training samples by applying a variable transformation about a right tilt direction;
creating a time-series prediction model of transformed training data;
applying the variable transformation with different directions for a test sample; and
calculating a matching ratio between the created time-series prediction model and the transformed test sample.

16. The robotic system of claim 15, wherein the time-series data includes six-dimensional time-series data.

17. The robotic system of claim 16, wherein one pair of the time-series data includes input forces.

18. The robotic system of claim 17, wherein another pair of the time-series data includes force sensor values.

19. The robotic system of claim 18, wherein another pair of the time-series data includes force sensor moments.

20. The robotic system of claim 15, wherein calculating the matching ratio includes determining a sum of squares of each time point when a force is applied to the first component.

* * * * *